(12) United States Patent
Chiang

(10) Patent No.: US 7,460,318 B2
(45) Date of Patent: Dec. 2, 2008

(54) LENS BARREL ASSEMBLY

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 43 days.

(21) Appl. No.: 11/309,572

(22) Filed: Aug. 24, 2006

(65) Prior Publication Data
US 2007/0097526 A1    May 3, 2007

(30) Foreign Application Priority Data
Oct. 28, 2005    (TW) .............................. 94137917 A

(51) Int. Cl.
*G02B 7/02*    (2006.01)
(52) U.S. Cl. ...................................... 359/819; 359/811
(58) Field of Classification Search ................... 359/819
See application file for complete search history.

(56) References Cited

U.S. PATENT DOCUMENTS

| | | | |
|---|---|---|---|
| 5,227,925 A * | 7/1993 | Eguchi | 359/892 |
| 2003/0025826 A1* | 2/2003 | Nakajoh | 348/374 |
| 2005/0062083 A1* | 3/2005 | You et al. | 257/291 |

* cited by examiner

*Primary Examiner*—Jessica T Stultz
*Assistant Examiner*—Mahidere S Sahle
(74) *Attorney, Agent, or Firm*—Steven M. Reiss

(57) ABSTRACT

A lens barrel assembly (30) is described that includes a hollow lens barrel (3), at least one lens (4) and a filter (5). The lens barrel has a mounting portion (311). The at least one lens is received in the lens barrel, and the filter is transversely mounted in the lens barrel along a direction perpendicular to an axis of the lens barrel such that the filter interferingly engages in the mounting portion. In use of the lens barrel assembly, it is not necessary to adhere the filter to the lens barrel. Accordingly, the pollution problem of the filter and the lenses is eliminated, the manufacture of the lens barrel assembly is simplified, and the manufacturing cost is decreased.

2 Claims, 5 Drawing Sheets

LENS BARREL ASSEMBLY

FIELD OF THE INVENTION

The present invention relates to lens barrel assemblies and, particularly, to a lens barrel assembly for use in a portable electronic device.

DESCRIPTION OF RELATED ART

With the development of scientific technology, portable electronic devices for imaging, such as digital cameras and mobile phones with lens barrel assemblies have all entered widespread use.

As well known, quality of the lens barrel assemblies is vital for imaging. In addition, the portable electronic device using the camera lens requires to be lighter in weight and to be smaller in size. So precision manufacture and assembly of the lens barrel assembly is a strict requirement.

What FIGS. 1 and 2 shows is a typical lens barrel assembly 10 including a lens barrel 11, two lenses 13, a fixing member 15 and an infrared filter 17. Each lens 13 is received in the lens barrel 11 and fixed by the fixing member 15. Various kinds of glues are applied to the exterior surface 171 of the infrared filter 17. The infrared filter 17 is fixed to the lens barrel 11 by using glue/adhesive to attach the peripheral exterior surface 171 to the interior surface of the lens barrel 11. In use of the lens barrel assembly 10, the incident light filters through the lens 13 and the infrared filter 17. Because infrared rays incident on a sensor can result in noise speckle, the infrared filter 17 functions to filter out infrared rays from the incident lights to improve the imaging quality of the lens barrel assembly 10.

In assembly of the lens barrel assembly 10, however, insufficient application of adhesive may decrease stability of the attachment between the infrared filter 17 and the lens barrel 11. Excessive application of adhesive may result in the unexpected penetration of the glue to the adjacent surface of the infrared filter 17, even to an exterior surface of the lens 13. This may result in the pollution of the infrared filter 17 and the lens 13, which may decrease the imaging quality. Considering above-mentioned facts, the strict control of the volume of adhesive applied is necessary, which may complicate the manufacture of the lens barrel assembly 10, and increase manufacturing cost.

What is needed, therefore, is a lens barrel assembly which overcomes the above-mentioned shortcomings.

SUMMARY OF THE INVENTION

In one embodiment thereof, a lens barrel assembly is provided comprising a hollow lens barrel, at least one lens and a filter. The lens barrel has a mounting portion. The at least one lens is received in the lens barrel, and the filter is transversely mounted in the lens barrel along a direction perpendicular to an axis of the lens barrel such that the filter interferingly engages in the mounting portion.

Other advantages and novel features will become more apparent from the following detailed description when taken in conjunction with the accompanying drawings.

BRIEF DESCRIPTION OF THE DRAWINGS

Many aspects of the lens barrel assembly can be better understood with reference to the following drawings. Drawings are not necessarily drawn to scale, the emphasis instead being placed upon clearly illustrating the principles of the present lens barrel assembly. Moreover, in the drawings, like reference numerals designate corresponding parts throughout the several views, in which.

DETAILED DESCRIPTION OF PREFERRED EMBODIMENTS

Figure 1:
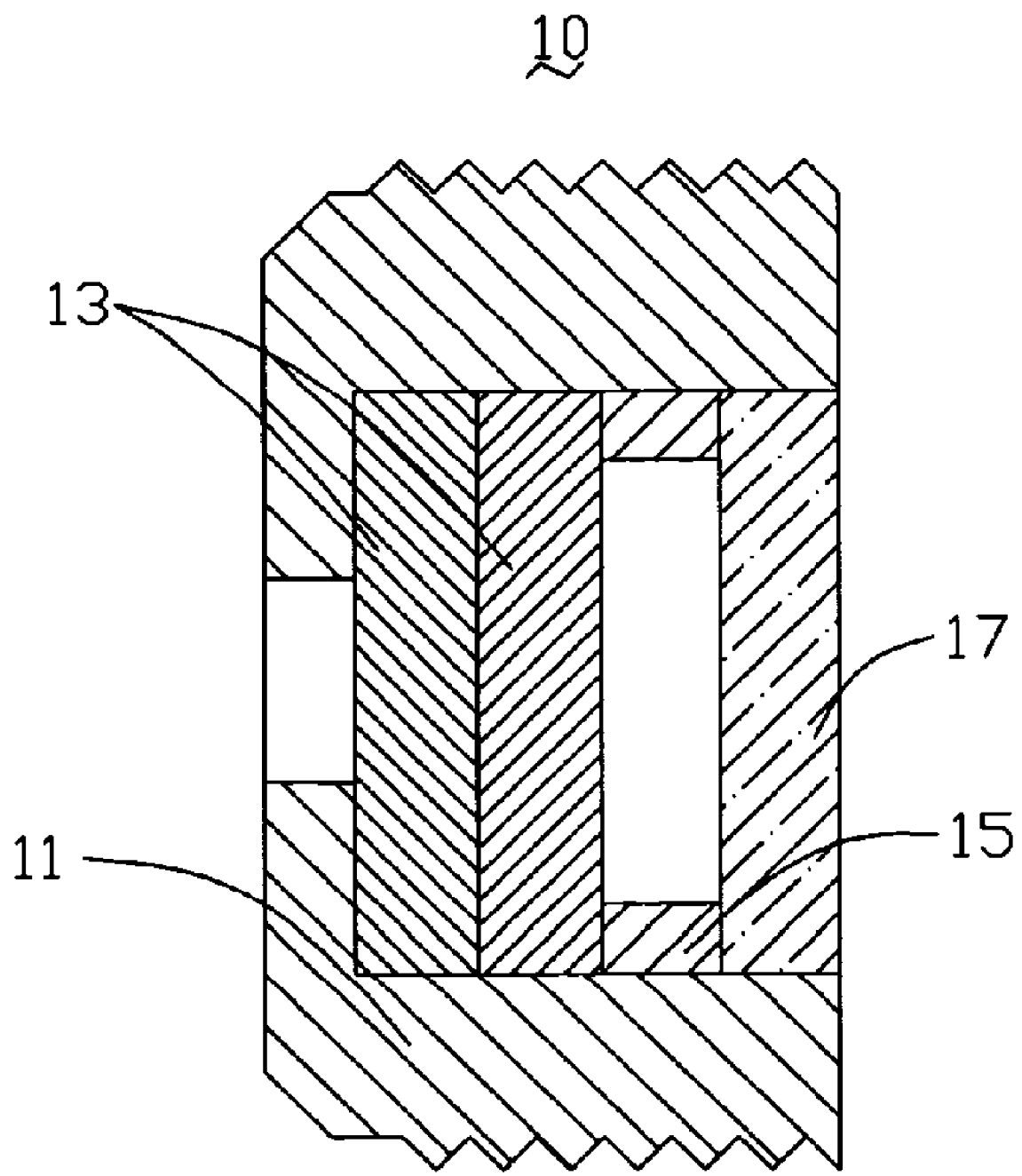
FIG. 1 is a cross-section view of a typical lens barrel assembly.
Figure 2:
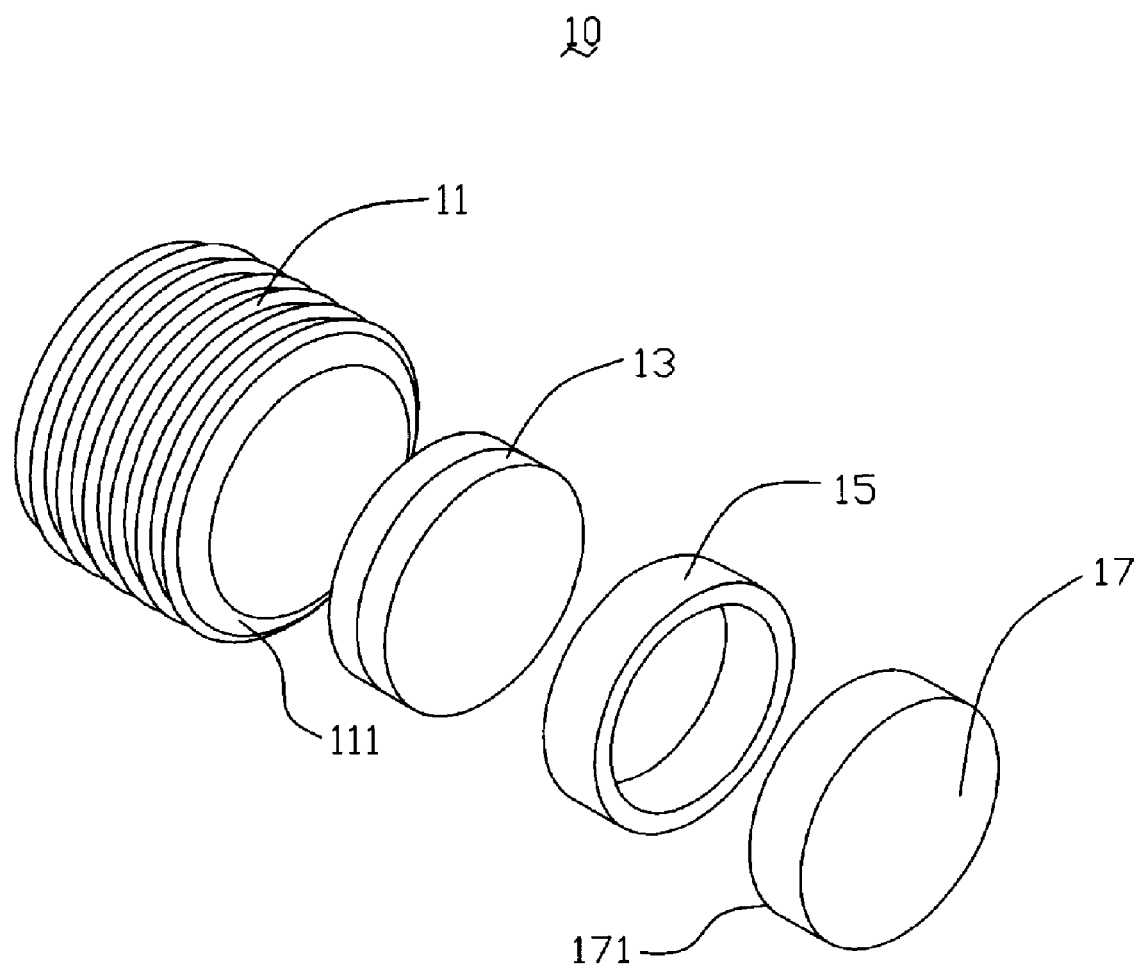
FIG. 2 is an exploded view of the typical lens barrel assembly shown in FIG. 1.
Figure 3:
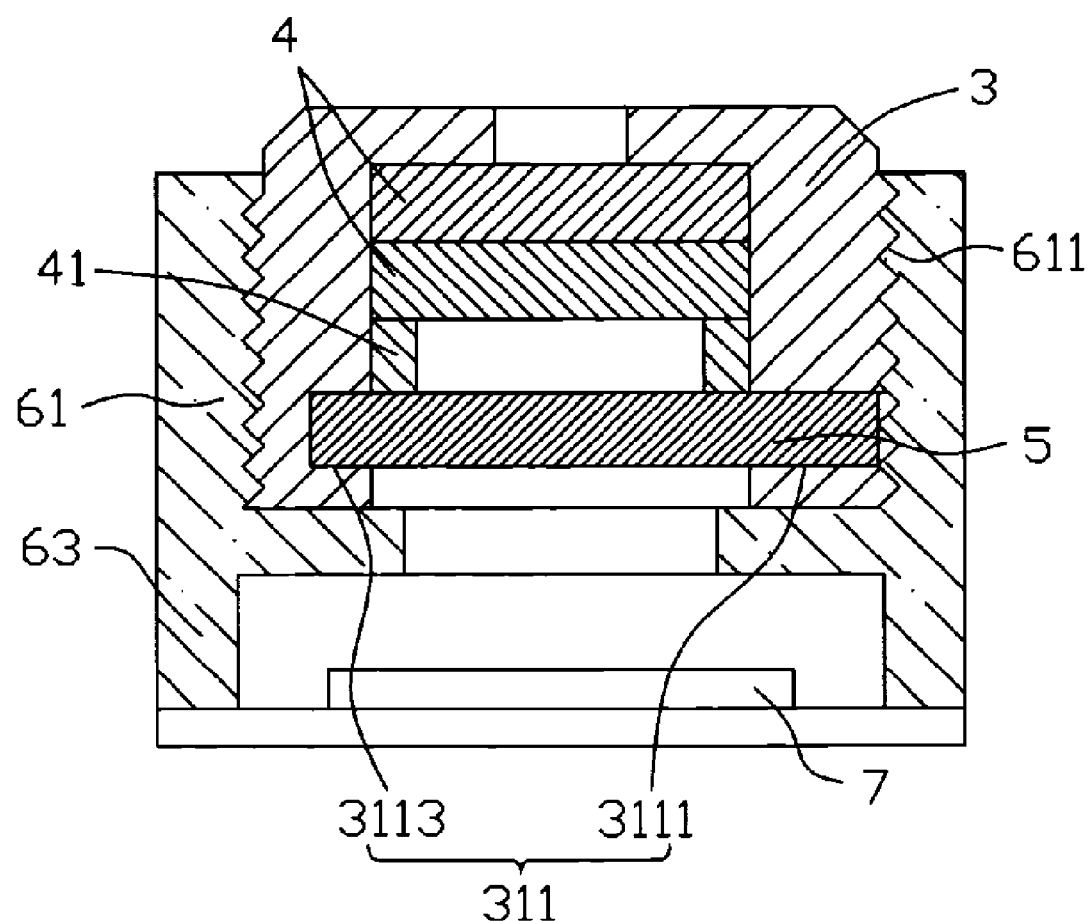
FIG. 3 is a cross-section view of an assembled lens barrel assembly including a lens barrel in accordance with a preferred embodiment.

Referring now to the drawing in detail, FIG. 3 shows camera module 20. The camera module 20 includes a lens barrel assembly 30, a lens holder 6 and an imaging device 7. The lens barrel assembly 30 includes a lens barrel 3, two lenses 4, and an infrared filter 5.

Figure 4:
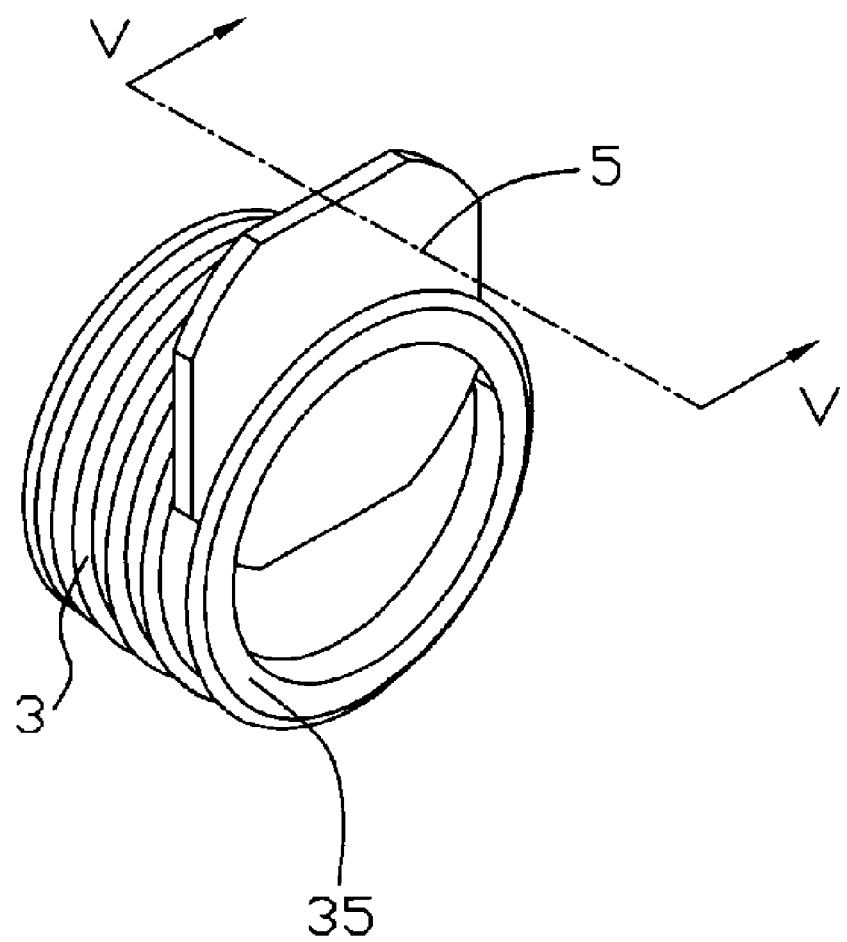
FIG. 4 is an isometric view of the lens barrel shown in FIG. 3.
Figure 5:
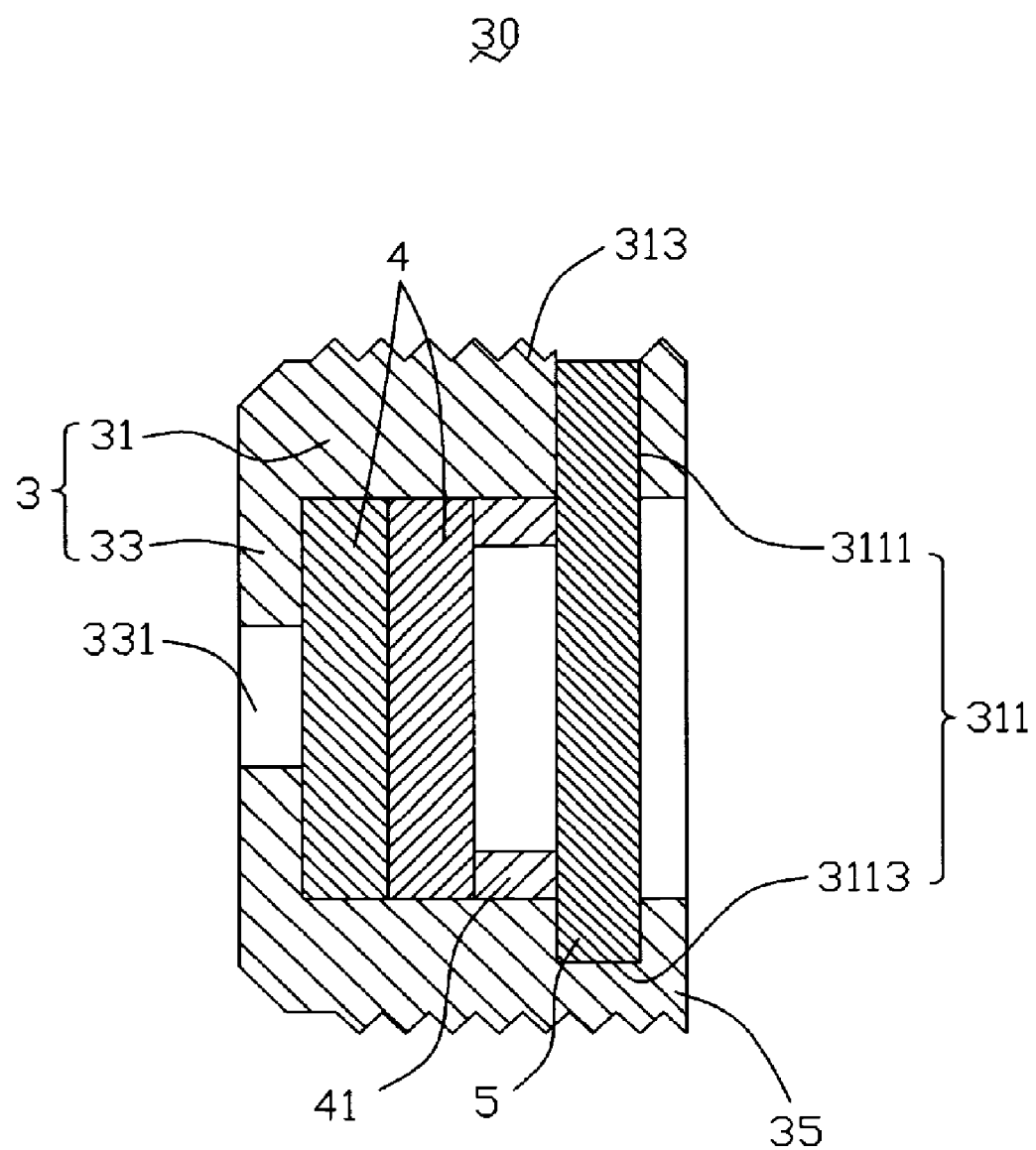
FIG. 5 is a cross-section view taken along line V-V of FIG. 4.

Referring also to FIGS. 4 and 5, the lens barrel 3 is generally cylinder-like, and includes a cylinder body 31, a semi-enclosed end plate 33 and an open end 35. The cylinder body 31 has a mounting slot 311 functioning as a mounting portion defined therein along a circumferential direction perpendicular to an axis of the cylinder body 31. The mounting slot 311 is adjacent to the open end 35. The mounting slot 311 includes an arcuate slit 3111 and a positioning slot 3113. The arcuate slit 3111 is defined through a portion of the circumferential wall of the cylinder body 31 along the circumferential direction, which communicates an inner space of the cylinder body 31 with outside. The positioning slot 3113 is defined in an inner circumferential surface along the circumferential direction and opposite to the arcuate slit 3111. The end plate 33 and the cylinder body 31 are integrally formed. The end plate 33 has a through hole 331 defined therethrough. The through hole 331 is located in the middle of the end plate 33. The exterior wall of the cylinder body 31 has an external thread 313 formed thereon.

Each lens 4 is received in the cylinder body 31 of the lens barrel 3 via the open end 35 of the lens barrel 3, and fixed in the lens barrel 3 by means of the fixing member 41 interferingly engaging in the cylinder body 31. Each lens 4 is used to focus incident lights that is transmitted through the open end 35.

The infrared filter 5 has a similar shape to the mounting slot 311. A thickness of the infrared filter 5 is preferably equal to or slightly greater than a width of the mounting slot 311 extending along the axis direction of the lens barrel such that the infrared filter 5 can interferingly engaging in the mounting slot 311. The infrared filter 5 is used to filter out infrared rays from the incident light that is transmitted through the open end 35 to improve the imaging quality of the camera module 20.

The lens holder 6 includes an upper barrel 61 and a lower barrel 63. The upper barrel 61 includes an inner surface that has an internal thread 611 formed thereon.

The imaging device 7 is received in the lower barrel 63. The imaging device 7 is configured (i.e., structured and arranged) to receive incident light filtered by the infrared filter 5 to create an exact image.

In assembly of the camera module 20, the two lenses 4 are respectively placed into the lens barrel 3 via the open end 35 along the axis thereof. The fixing member 41 is interferingly received in the lens barrel 3 via the open end 35 to secure the lenses 4 in the lens barrel 3, thus the lenses 4 are not being capable of moving axially. The infrared filter 5 is aligned with the through slit 3111 of the lens barrel 3, and inserted into through slit 3111 of the lens barrel 3 transversely. The infrared filter 5 is pushed into the lens barrel 3 along a direction perpendicular to the axis of the lens barrel 3 until one end of the infrared filter 5 is received in the positioning slot 3113 and abuts the circumferential wall of the lens barrel 3. At the same time, the other end of the infrared filter 5 that is located in the arcuate slit 3111 has the same height as the external thread 313 of the lens barrel 3. As such, the lens barrel assembly 30 is assembled as shown in FIG. 5. The combined lens barrel assembly 30 is helically rotated into the upper barrel 61 of the lens holder 6 by means of the engagement of the external thread 313 with the internal thread 611. In this case, the internal thread 611 resists the end of the infrared filter 5 received in the arcuate slit 3111.

In use of the camera module 20, a main advantage is that the infrared filter 5 may not move along the axial direction of the lens barrel 3 because of the tight engagement of the infrared filter 5 with the mounting slot 311. The resisting of the internal thread 611 with the infrared filter 5 reliably fixes the infrared filter 5 to the lens barrel 3. Therefore, it is not necessary to use adhesive to attach the infrared filter 5 to the lens barrel 3. Accordingly, the pollution problem of the infrared filter 5 and the lenses 4 is eliminated, the manufacture of the lens barrel assembly 30 is simplified, and the manufacturing cost is decreased.

In further alternative embodiments, the infrared filter 5 could be replaced by other types of filters.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens barrel assembly, comprising:
  a lens barrel having an inner periphery defining a mounting slot along a circumferential direction thereof, the lens barrel comprising:
    a cylinder body, the mounting slot further defined along the direction perpendicular to an axis of the cylinder body;
    a semi-enclosed end plate; and
    an open end, the end plate having a through hole defined therethrough;
    and the mounting slot comprising:
    an arcuate slit defined through a portion of the circumferential wall of the cylinder body along the circumferential direction; and
    a positioning slot defined in an inner circumferential surface of the cylinder body along the circumferential direction and opposite to the arcuate slit;
  at least one lens being received in the lens barrel; and
  a filter being securely mounted in the lens barrel merely by means of the filter engaging into the mounting slot so as to prevent the filter from being disengaged from the mounting slot along a direction of incident light filtering through the filter.

2. The lens barrel assembly as claimed in claim 1, further comprising a fixing member fixing the at least one lens with the cylinder body.

* * * * *